Jan. 17, 1950    R. L. JEAN-BAPTISTE SANMORI    2,494,902
FRONT AND REAR ENGINE WHEEL DRIVE
UNIT FOR ROAD VEHICLES
Filed March 1, 1946    3 Sheets-Sheet 1

INVENTOR
Roger Laurent Jean-Baptiste Sanmori
BY Moeks + Blum
ATTORNEYS

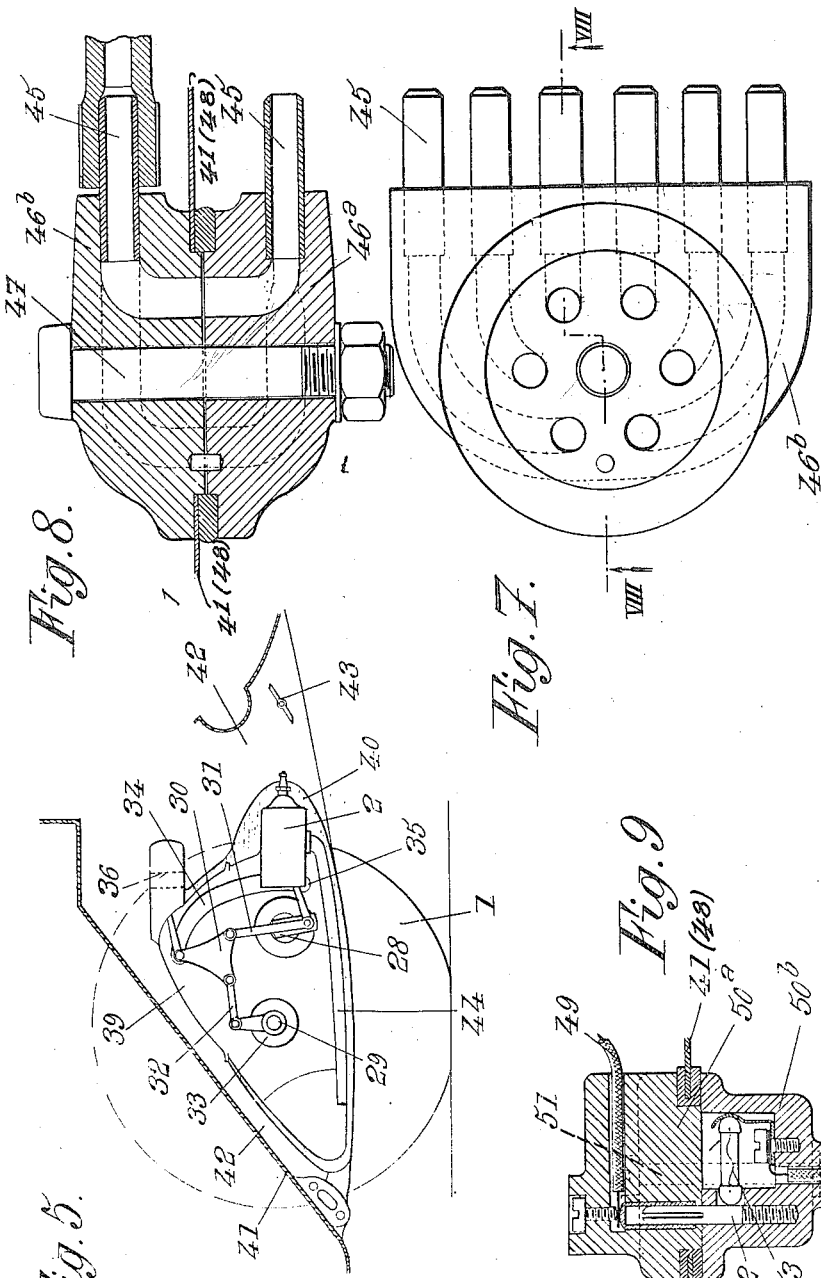

Patented Jan. 17, 1950

2,494,902

UNITED STATES PATENT OFFICE 2,494,902

FRONT AND REAR ENGINE WHEEL DRIVE UNIT FOR ROAD VEHICLES

Roger Laurent Jean-Baptiste Sanmori,
Monaco, Monaco

Application March 1, 1946, Serial No. 651,341
In France September 25, 1945

6 Claims. (Cl. 180—54)

The present invention relates to road vehicles and more especially, although not exclusively, touring cars.

Its object is to provide a vehicle of this kind which is better adapted to meet the requirements of practice than those made up to the present time.

Preferred embodiments of my invention will be hereinafter described with reference to the accompanying drawings, given merely by way of example, and in which:

Fig. 5 is a diagrammatic longitudinal section of the power plant carried by said front part of the vehicle;

Figs. 7 and 8 show, respectively in plan view and in section on the line VIII—VIII of Fig. 7, a coupling device for grouping together various pneumatic control conduits included in the vehicle system;

Fig. 9 is a cross section of a coupling device for grouping together various electric circuits included in the vehicle system.

Figure 1:
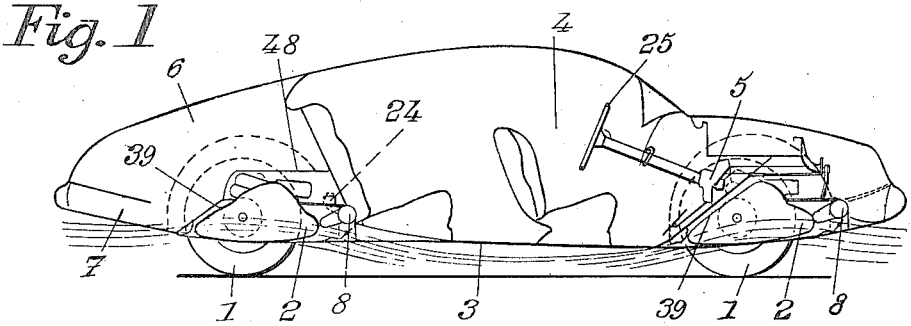
Figs. 1 and 2 are diagrammatical views showing, respectively in elevational and in plan view, a vehicle made according to my invention.
Figure 2:
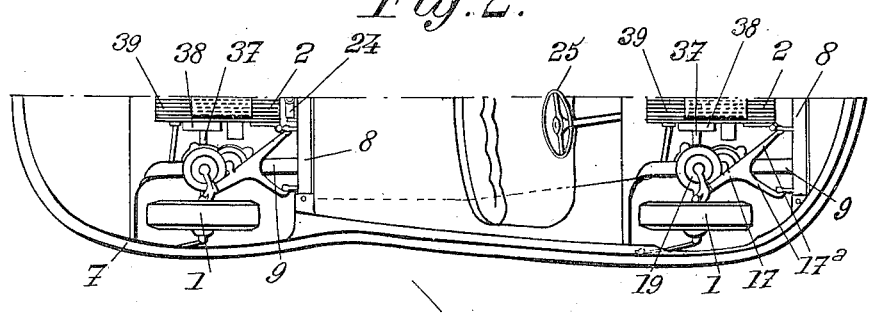

The invention illustrated by the drawings relates to a road automobile vehicle having four wheels 1 forming two wheel trains or pairs, to wit a front pair and a rear pair.

According to a feature of my invention, each train or pair of wheels, together with the corresponding suspension means, annexed devices and (in the case of the wheels of this train being driving wheels) power plant, are carried by an intermediate frame adapted to be connected in a detachable manner with the main structure of the vehicle.

With such an arrangement, it will suffice to detach this intermediate frame from the body of the vehicle for making it possible to disengage the whole of the mechanical parts relating to one pair of wheels.

It will be readily understood that such a possibility considerably simplifies the assembly or taking into parts of the vehicle and further facilitates eventual repairs to be made on any of said mechanical parts, since the whole of said parts can, after disengagement from the main structure of the vehicle, be brought into any position that facilitates the performing of this repair.

In the embodiment of my invention that is to be described with reference to the drawings, both of the pairs of wheels are driving wheel trains or at least are adapted to be used as driving wheel trains and, furthermore, the four wheels are adapted to take steering displacements. Thus the front and rear wheel trains are adapted to perform the same functions.

Advantageously, according to a feature of my invention, both of the power plants that are to drive these trains of wheels are air cooled engines 2, located one behind the other, and carried by the intermediate frames above referred to respectively, preferably at the approximate level of the car floor 3, whereby the cooling of said engines can be ensured by the air stream flowing between said floor and the ground when the vehicle is running.

Such an arrangement has many advantages, among which the following can be cited:

The center of gravity of the whole vehicle is lowered and brought to a position substantially at equal distance from the front and rear trains of wheels, which is favorable to a good road holding.

There is left, between the two intermediate frames, a clear space which can be utilized for lodging the passengers inside a bodywork 4, which can be made large and well streamlined in order to reduce head resistance.

As the engines are located at a relatively low level, a certain space is left available above each of them, which can be utilized, for instance, in the front train for housing the steering gear 5 and in the rear train for housing luggage, at 6.

The main structure of the vehicle may be of any suitable construction. Advantageously, it is made as described in my copending U. S. patent application Ser. No. 654,833 filed March 16, 1946, for improvements in Motor cars and therefore includes, as chief working element, a tubular beam 7, of closed section, extending around the wheels 1 of the vehicle.

This construction makes it possible to provide, in the front and rear portions of the vehicle structure, important clear spaces for accomodating the intermediate frames, which then participate in the bracing of said structures in these portions thereof.

Figure 6:
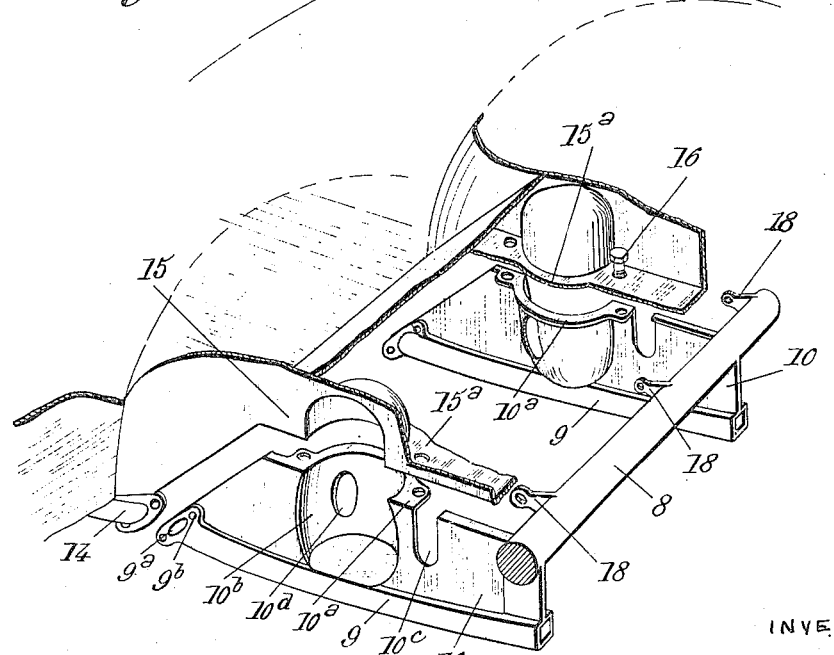
Fig. 6 is a perspective view of a frame for supporting said power plant.

Concerning the intermediate frames, both of them are advantageously made identical. Preferably, each of them is of the construction shown by Fig. 6, i. e. of general U shape, with the base of the U turned toward the front of the vehicle and constituted by a tubular cross member 8, and the branches of the U constituted by tubular elements 9, for instance of square section, supporting substantially vertical metal plates 10.

The means for removably fixing these intermediate frames to the main structure of the vehicle are preferably made as follows:

Tubular beam 7 is provided, opposite cross member 8, with stirrups 11 the branches of which extend downwardly so as to engage on either side of the ends of said cross member 8. Said cross member is fixed in position inside said stirrups by means of a bolt 13 extending through the stirrup, the cross member and a plate 12 applied against the under face of said cross member, the nut that cooperates with said bolt bearing against said plate 12.

The rear end of each tubular element 9 of the frame forms a fixation part 9a adapted to be secured to a corresponding part carried by an arm 14 rigid with the vehicle body. Part 9a is secured by means of bolts extending through a coupling flange 9b.

The vehicle body further includes a kind of metallic hood 15 the substantially vertical walls of which are adapted to be in line, when the intermediate frame is fitted in position, with the side plates 10 of said frame, said walls of the hood and said side plates being then assembled together along bent edges 15a, 10a, respectively, which are fixed to one another by means of bolts 16, for instance two for each side plate.

The means for connecting the wheels to each intermediate frame are of course made according to the construction of the suspension system of the vehicle. In the following description, it will be supposed that the suspension system is of the kind described in my U. S. Patent No. 2,443,433, dated June 15, 1948, for Fluid pressure suspension systems for vehicles.

Such a system includes, for each wheel, a lever 17 pivoted to the vehicle frame and carrying at its free end the wheel stub axle, said lever being supported by two pneumatic cushions carried by the vehicle frame and acting in opposition on said lever, one in the upward and the other in the downward direction.

In the vehicle according to the present invention, each of these levers 17 has a forked end 17a the branches of which are pivoted to supports 18 carried by cross member 8 on either side of the corresponding element 9. A notch 10c is provided in the side plate 10 carried by said element, so as to afford passage for one of the branches of fork 17a.

Metal sheets 10 and 15 are given a curved shape so as to form together a kind of open housing 10b for cushions 19.

Figure 3:
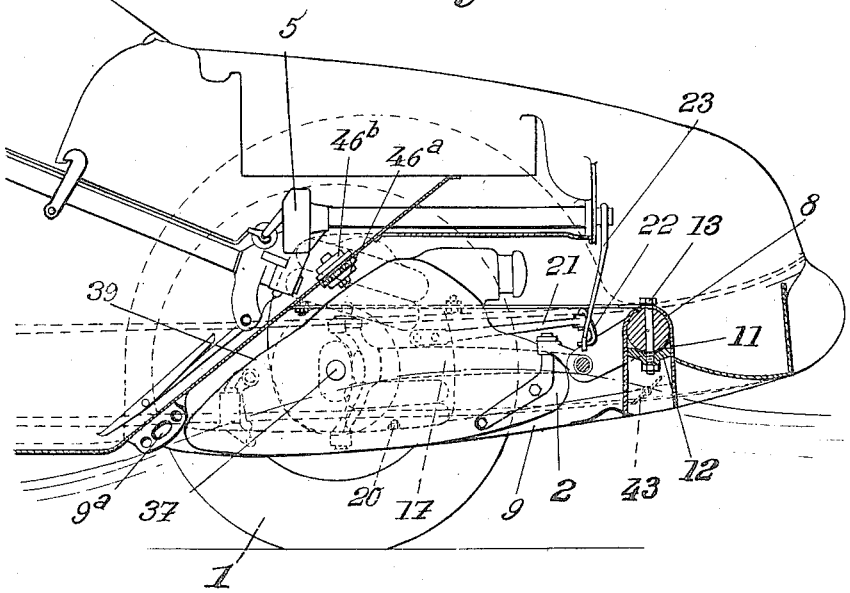
Figs. 3 and 4 show, on a larger scale, respectively in elevation and in plan view, with elements in section and elements removed, the front part of said vehicle.

Advantageously, tubular elements 9 are used as compressed air conduits for connecting each lower cushion with the upper cushion of the diagonally opposed wheel. For this purpose, element 9 is provided with a connecting valve 20 opposite the lower cushion (Fig. 3).

It should be noted that such a suspension system, which ensures a uniform distribution of the loads on the four wheels, is well adapted to the case of a construction making use of identical parts for the front wheel suspension and the rear wheel suspension.

Advantageously, as shown by the drawing, the vehicle steering gear is made as follows:

Every wheel stub axle carrier is provided with a control arm 21, linked with a transverse bar 22. In the case of the front pair of wheels, this bar 22 is connected to a central arm 23, and in the case of the rear pair of wheels to a pneumatic servo-motor 24 carried by the corresponding intermediate frame, the system 21—22 being same for both pairs of wheels.

On the other hand, the whole of the parts serving to control central arm 23 and servo-motor 24 forms a pivoting unit the displacements of which serve to the transverse adjustment of the position of steering wheel 25.

Concerning each air cooled engine 2, it is mounted between the side plates of the corresponding intermediate frame to which it is secured by means of bolts and fixation pieces 26, for instance four in number, bearing, through elastic pads 27, at the front on parts 18 rigid with cross member 8, and at the rear on tubular elements 9.

Preferably, each engine includes a plurality of cylinders disposed flatwise and in a transverse line so that their heads are all turned toward the front of the vehicle, whereby the cooling air stream first comes to flow along this warmest portion of the engine.

According to the preferred embodiment illustrated by Fig. 5, the engine is a two stroke four cylinder engine the crankshaft 28 of which is connected to a receiving shaft 29 through a continuous change speed device of the kind described in the French Patent No. 814,848. This device includes four elementary coupling devices capable of successively ensuring the drive of receiving shaft 29, each for a rotation of 90° of crankshaft 28.

Each of these elementary coupling devices includes the following elements:

*a.* A bell crank piece 30 connected directly to crankshaft 28 by a driving link rod 31 and indirectly to receiving shaft 29 through a receiving link rod 32 cooperating with a free wheel device 33 carried by said receiving shaft; and

*b.* An adjustable support for this bell crank piece 30, this support being for instance constituted by a part 34 pivoted at one of its ends about a fixed axis 35 while its other end, which carries bell crank piece 30 is fixed to the rod of an operating piston 36.

The displacements of support 34 vary, for every elementary coupling device, the ratio of the angles of rotation described during the same time by crankshaft 28 and receiving shaft 29 respectively, that is to say the ratio of the angular velocities of these two shafts.

Receiving shaft 29 is coupled with the wheels 1 of the corresponding pair of wheels through shafts 37 driven through elastic joints 38 and passing through holes 10d provided in the side plates 10 of the intermediate frame.

Advantageously, as shown by the drawing, the movable parts of every change speed device are grouped in the casing of the corresponding engine, this casing forming, together with the cylinder heads mounted at its front part, a streamlined cowling. I provide, on at least a portion of the surface of this cowling and in particular on the under face thereof and on the cylinder heads that project at the front thereof, cooling fins 40 disposed longitudinally in such manner as to facilitate the flow of the cooling air stream.

Furthermore, in order to improve the guiding of air flowing around cowling 39, the various metal sheet walls that limit the space inside which is housed this cowling, and in particular metal sheet 41, which is located under the instrument board, are suitably inclined in such manner as to form a kind of tunnel 42 corresponding in shape to the outer surface of cowling 39. A shutter plate 43 controlled from a distance is advantageously provided at the inlet end of said tunnel so as to enable the driver to control the flow of cooling air.

The positions chosen for the two power plants of the vehicle are particularly suitable for the obtainment of intensive cooling streams, for the following reasons:

Concerning the front power plant, the air tunnel inlet is located in a zone of high pressure due to the slight positive incidence of the nose of the vehicle, while the outlet of said tunnel is located, at the rear of the front wheels, in a zone of normal pressure, and possibly of slight suction.

Concerning the rear power plant, the air tunnel inlet is located, ahead of the rear wheels, in a zone of slight overpressure, while the outlet of said tunnel opens into a zone of intensive suction, near the vehicle tail, the drop of pressure between inlet and outlet being thus substantially the same for this rear tunnel as for the front tunnel.

It is to be noted that the location of both of these tunnels under the vehicle makes it possible to provide masked air inlets, i. e. air inlets which have no detrimental effect on the general streamlining of the vehicle.

It is further possible to increase the rapidity with which the cooling effect takes place by making the walls of engine 2 and of cowling 39, as well as fins 40, of a metal of high thermic diffusibility, for instance of a light alloy.

As the cooling effect is particularly intensive along the under wall of cowling 39, I advantageously dispose the exhaust ports and the exhaust tubes 44 of the engine close to said bottom wall, so that they are efficiently cooled even when shutter 43 is in the closed position.

It should be noted that, in a general manner, the problem of cooling the engines is particularly well solved in a system as above indicated, owing to the fact that the total diffusion area, to wit that of two engines, is greater than the diffusion area of a single engine of equivalent power and that the air cooling system that is adopted has a lower thermal inertia than the liquid cooling system (for equal powers of course) which further requires, from the constructional point of view, a radiator and a cooling liquid circuit. This low thermal inertia will be especially interesting in the case, which will be hereinafter more explicity considered, in which one of the engines is temporarily cut off, the bringing into or out of action of one of the engines then giving rise to relatively low losses of calories.

Concerning the various connections to be provided, both from the pneumatic or hydraulic and the electric point of view between control parts carried by the instrument board of the vehicle or by the steering wheel and various pneumatic or hydraulic and electric mechanisms or devices carried by the intermediate frames, they are preferably arranged in such manner that the various circuits of the same nature (i. e. pneumatic or hydraulic circuits on the one hand and electric circuits on the other hand) pass through a common coupling device made of two separable portions one of which remains fixed to the vehicle body while the other, which is connected to said mechanisms or devices can be detached from said body together with the corresponding intermediate frame.

Examples of such coupling devices are illustrated by Figs. 7, 8 and 9.

The device of Figs. 7 and 8 serves to the coupling of pneumatic and/or hydraulic conduits. The various conduits 45 for fluid under pressure are mounted on a common box made of two halves 46ª and 46ᵇ assembled together by means of any suitable means such as a bolt 47. Continuity is ensured for each of the fluid circuits by the fact that two conduits 45 carried respectively by said halves 46ª and 46ᵇ that correspond to the same circuit have their apertures tightly applied against each other when said halves are assembled together.

On the other hand, said halves are mounted respectively on either side of one of the walls of the vehicle body that limit the housing in which the intermediate frame is to be housed, for instance, wall 41 for the front wheel train and wall 48 for the rear wheel train.

Fig. 9 shows a device for coupling together a plurality of electric circuits. In this case, the device is constituted by a kind of multiple plug box made of two halves 50ª and 50ᵇ to which lead the various electric conductors 49 which constitute the elements of the electric circuits in question. As in the case of the preceding device, one of these halves is carried by a partition wall such as 41 (or 48 in the case of the rear wheel train) and the other is to be carried by the intermediate frame supporting the devices operated through said electric circuits, in such manner that said halves are brought into position of assembly when said intermediate frame is mounted in its housing in the vehicle structure. These halves are kept in assembled position by any suitable means, for instance a bolt 51.

Preferably, the plugs 52 are carried by the half that is mounted on the intermediate frame, the corresponding sockets being carried by the other half. Safety fuses 53 are provided for each conductor 49.

Figure 4:
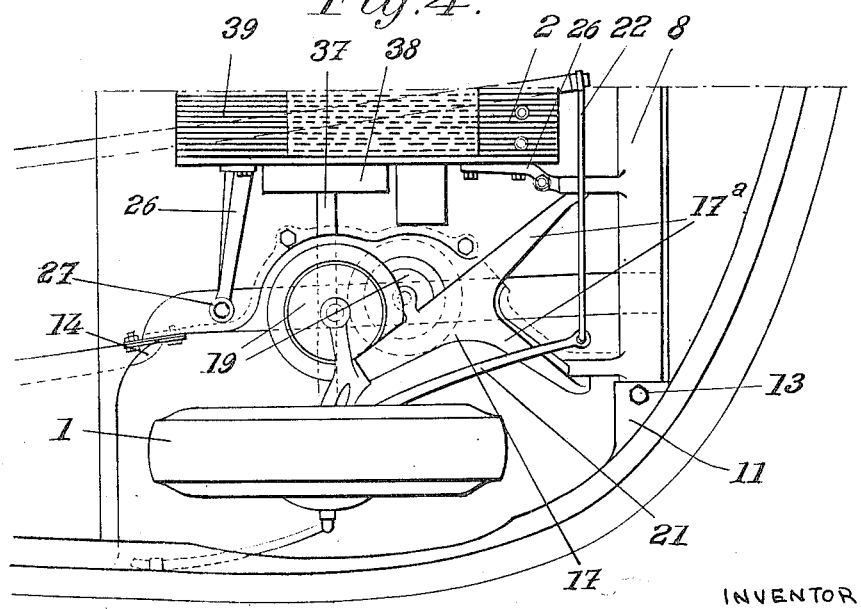

With an automobile vehicle provided with two power plants as above described, the removal of a wheel train is extremely simple. As above explained, the intermediate frame is connected to the vehicle main structure through a limited number of bolts and it suffices to remove these bolts for detaching the frame, together with the wheels and the engine corresponding thereto, from the remainder of the vehicle. Any pneumatic or hydraulic and electric connections as may exist between parts carried by said intermediate frame and the remainder of the vehicle, respectively, can easily be cut off owing to the provision of devices such as disclosed by Figs. 6 to 9. Cable connections can also be interrupted without difficulty and the steering gear (Fig. 4) can easily be separated from the wheels. As the fixation means are both simple and readily accessible (by lifting the hood in the case of the front wheel train and by opening a suitable aperture in the case of the rear wheel train), the removal of either of the above mentioned units can be performed quickly and without risks of injuring the bodywork of the vehicle.

Furthermore, if, as above stated, both of the units in question are made identical, each of them including elements which, if not actually in use in one of the positions in question (front or rear), are ready for use when the unit is mounted in the other position, the following advantages are obtained:

a. Manufacture is greatly simplified;
 b. The front and rear units can be interchanged whenever desired (for instance if the engine that is less often utilized is working better than the other;

c. If, as it is advisable, only one of the units is normally used as driving unit, it is possible, by periodically interchanging the two units, to reduce their wear;

d. A fully equipped spare unit can be kept in reserve so as to be immediately substituted to either of the units actually in use, in case of failure thereof.

Other advantages result from the preceding description.

While I have, in the above description, disclosed what I deem to be a practical and efficient embodiment of the present invention, it should be well understood that I do not wish to be limited thereto as there might be changes made in the arrangement, disposition and form of the parts without departing from the principles of the present invention as comprehended within the scope of the appended claims.

What I claim is:

1. A road vehicle which comprises, in combination, a main structure, including a continuous external beam, a body carried by said beam and a floor for said body extending along the intermediate portion of said body, at least two intermediate frames each including a cross member and two side elements, so as to be of general U shape, adapted to fit in said main structure inside said beam, one ahead of said floor and the other at the rear thereof, with their respective cross members at the front, means for detachably securing the ends of said cross members to said external beam, means for detachably securing said side elements to said body, a pair of wheels mounted on each of said intermediate frames inside said external beam, an engine carried by each intermediate frame, between the branches of the U, and power transmitting means between each engine and the pair of wheels mounted on the same intermediate frame.

2. A road vehicle which comprises, in combination, a main structure, including a continuous external beam, a body carried by said beam and a floor for said body extending along the intermediate portion of said body, at least two intermediate frames each including a cross member and two side elements, so as to be of general U shape, adapted to fit in said main structure inside said beam, one ahead of said floor and the other at the rear thereof, with their respective cross members at the front, means for detachably securing the ends of said cross members to said external beam, means for detachably securing said side elements to said body, a pair of wheels mounted on each of said intermediate frames inside said external beam, an air cooled engine carried by each intermediate frame, between the branches of the U substantially at the level of said floor, and power transmitting means between each engine and the pair of wheels mounted on the same intermediate frame.

3. A road vehicle which comprises, in combination, a main structure, including a continuous external beam and a body carried by said beam, at least two intermediate frames each including a cross member adapted to fit in said main structure inside said beam, one of said cross members being located at the front part of the structure and the other at a distance from the rear end thereof, means for detachably securing the ends of said cross members to said external beam, a pair of wheels mounted on each of said intermediate frames behind the cross member thereof, inside said external beam, an engine carried by each intermediate frame, and power transmitting means between each engine and the pair of wheels mounted on the same intermediate frame.

4. A road vehicle which comprises, in combination, a main structure, including a continuous external beam and a body carried by said beam, at least two intermediate frames each including a cross member adapted to fit in said main structure inside said beam, one of said cross members being located at the front part of the structure and the other at a distance from the rear end thereof, means for detachably securing the ends of said cross members to said external beam, means for detachably securing said intermediate frames to said body, a pair of wheels mounted on each of said intermediate frames behind the cross member thereof, inside said external beam, an engine carried by each intermediate frame, and power transmitting means between each engine and the pair of wheels mounted on the same intermediate frame.

5. A road vehicle which comprises, in combination, a main structure, including a continuous external beam and a body carried by said beam, at least two intermediate frames each including a cross member adapted to fit in said main structure inside said beam, and arms rigid with said cross members and extending transversely thereto, one of said cross members being located at the front part of the structure and the other at a distance from the rear end thereof, means for detachably securing the ends of said cross members to said external beam, means for detachably securing said arms to said body, a pair of wheels mounted on each of said intermediate frames behind the cross member thereof, inside said external beam, an engine carried by each intermediate frame, and power transmitting means between each engine and the pair of wheels mounted on the same intermediate frame.

6. A road vehicle according to claim 3 in which both of the units formed by an intermediate frame and the pair of wheels, engine and power transmitting means carried by said frame are identical.

ROGER LAURENT JEAN-BAPTISTE SANMORI.

REFERENCES CITED

The following references are of record in the file of this patent:

UNITED STATES PATENTS

| Number | Name | Date |
| --- | --- | --- |
| 1,331,478 | Bair | Feb. 24, 1920 |
| 1,702,865 | Gerin | Feb. 19, 1929 |
| 2,001,029 | Kulick et al. | May 14, 1935 |
| 2,047,336 | Stout | July 14, 1936 |
| 2,139,750 | Hicks | Dec. 13, 1938 |
| 2,257,964 | Klavik | Oct. 7, 1941 |
| 2,349,940 | Craig | May 30, 1944 |

FOREIGN PATENTS

| Number | Country | Date |
| --- | --- | --- |
| 480,585 | Great Britain | Feb. 21, 1938 |